(12) United States Patent
Imoto et al.

(10) Patent No.: US 9,430,132 B2
(45) Date of Patent: Aug. 30, 2016

(54) INFORMATION PROCESSING APPARATUS, INFORMATION PROCESSING METHOD, AND PROGRAM

(71) Applicant: Sony Corporation, Tokyo (JP)

(72) Inventors: Maki Imoto, Tokyo (JP); Shinichi Kawano, Tokyo (JP); Kunihito Sawai, Kanagawa (JP); Tsubasa Tsukahara, Tokyo (JP); Ikuo Yamano, Tokyo (JP)

(73) Assignee: Sony Corporation (JP)

( * ) Notice: Subject to any disclaimer, the term of this patent is extended or adjusted under 35 U.S.C. 154(b) by 221 days.

(21) Appl. No.: 14/228,718

(22) Filed: Mar. 28, 2014

(65) Prior Publication Data

US 2014/0304655 A1    Oct. 9, 2014

(30) Foreign Application Priority Data

Apr. 5, 2013   (JP) ................................ 2013-079429

(51) Int. Cl.
| | | |
|---|---|---|
| G06F 3/048 | (2013.01) | |
| G06F 3/0484 | (2013.01) | |
| G06F 3/0488 | (2013.01) | |
| G06F 17/24 | (2006.01) | |

(52) U.S. Cl.
CPC ......... *G06F 3/04842* (2013.01); *G06F 3/0488* (2013.01); *G06F 17/24* (2013.01); *G06F 2203/04803* (2013.01)

(58) Field of Classification Search
CPC .. G06F 3/04842; G06F 3/0488; G06F 17/24; G06F 2203/04803
USPC ...................................................... 715/823
See application file for complete search history.

(56) References Cited

U.S. PATENT DOCUMENTS

| | | | |
|---|---|---|---|
| 8,255,830 B2 | 8/2012 | Ording et al. | |
| 8,370,736 B2 | 2/2013 | Ording et al. | |
| 8,510,665 B2 | 8/2013 | Ording et al. | |
| 8,584,050 B2 | 11/2013 | Ording et al. | |
| 8,661,362 B2 | 2/2014 | Kocienda et al. | |
| 2005/0168488 A1* | 8/2005 | Montague ........... | G06F 3/04845 345/659 |
| 2007/0260981 A1* | 11/2007 | Kim .................... | G06F 3/04812 715/256 |
| 2009/0182552 A1* | 7/2009 | Fyke .................... | G06F 3/0488 704/9 |
| 2010/0235734 A1 | 9/2010 | Ording et al. | |
| 2010/0235778 A1* | 9/2010 | Kocienda .............. | G06F 1/1626 715/781 |
| 2010/0235783 A1 | 9/2010 | Ording et al. | |
| 2010/0235784 A1 | 9/2010 | Ording et al. | |
| 2010/0235793 A1 | 9/2010 | Ording et al. | |
| 2011/0035209 A1* | 2/2011 | Macfarlane .......... | G06F 3/0237 704/9 |
| 2012/0206367 A1* | 8/2012 | Griffin ................. | G06F 3/0237 345/169 |

FOREIGN PATENT DOCUMENTS

| | | |
|---|---|---|
| JP | 2005-182487 A | 7/2005 |
| JP | 2012-521048 A | 9/2012 |

* cited by examiner

*Primary Examiner* — William Bashore
*Assistant Examiner* — Gregory A Distefano
(74) *Attorney, Agent, or Firm* — Lerner, David, Littenberg, Krumholz & Mentlik, LLP

(57) ABSTRACT

There is provided an information processing apparatus including a text extraction unit that extracts selection candidate text from a text string displayed on a display screen, and a selection area placement unit that places selectable areas for the selection candidate text on the display screen in a manner that the selectable areas differ from a display area of the selection candidate text.

15 Claims, 18 Drawing Sheets

FIG.5

/sdcard/iceice.txt

All right stop
collaborate and listen
Ice is back with my
brand new invention
Someting grabs a hold
of me tightly
Flow like a harpoon
daily and nightly
Will [it] ever stop yo I
don't know

| daily | and | nightly |
|-------|-----|---------|
| Will  | it  | ever    |
| don't | know |        | a chump like a candle
Dance go rush to the

FIG.6

/sdcard/iceice.txt

All right stop
collaborate and listen

| daily | and | nightly |
|-------|-----|---------|
| Will  | it  | ever    |
| don't | know |        |

Will [it] ever stop yo I
don't know
Turn off the lights and
I'll glow
To the extreme I rock a
mic like a vandal
Light up a stage and wax
a chump like a candle
Dance go rush to the

FIG.7

/sdcard/iceice.txt

All right stop
collaborate and listen
Ice is back with my
brand new invention
Someting grabs a hold
of me tightly

| daily | and | nightly |
| Will | it | ever |
| don't | know | |

I'll glow
To the extreme I rock a
mic like a vandal
Light up a stage and wax
a chump like a candle
Dance go rush to the

FIG.8

/sdcard/iceice.txt

All right stop
collaborate and listen
Ice is back with my
brand new invention
Someting grabs a hold
of me tightly

| and | nightly |
| it | ever |
| know | |

I'll glow
To the extreme I rock a
mic like a vandal
Light up a stage and wax
a chump like a candle
Dance go rush to the

SELECT ROW CONTAINING DESIRED WORD

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2013-079429 filed Apr. 5, 2013, the entire contents of which are incorporated herein by reference.

BACKGROUND

The present disclosure relates to an information processing apparatus, an information processing method, and a program.

A variety of information processing apparatus including touch panels, such as smartphones, have been developed these days. Generally, a touch panel integrally includes a display device for displaying a display screen and an input device for user input. The touch panel also has a function of detecting a location of a user's touch with his/her finger, a specially provided pen, or the like. The user can give a processing instruction to the information processing apparatus by directly touching the display screen displayed on the touch panel.

For example, JP 2012-521048T discloses technology that cuts or copies a part of text displayed on a touchscreen display with an insertion marker 510 that moves according to a finger detection position. Also, JP 2005-182487A discloses technology that, when a user taps the position of a key on a virtual keyboard 20 displayed on a touch panel 10, displays on the touch panel 10 an enlarged key 18 that indicates the key corresponding to the tapped position.

SUMMARY

However, with the above technology, it is difficult for a user to select text displayed on a display screen. For example, with the above technology, in the case of selecting a position of text by tapping a touch panel, the text to be selected is obscured in the user's field of view by the user's finger or nail, making it difficult to accurately select the position that the user wants to select. Additionally, with the above technology, it is also difficult to accurately select text that the user wants to select in the case in which the text displayed on the display screen has a small display size.

Accordingly, the present disclosure proposes a new and improved information processing apparatus, information processing method, and program enabling a user to more easily select text displayed on a display screen.

According to an embodiment of the present disclosure, there is provided an information processing apparatus including a text extraction unit that extracts selection candidate text from a text string displayed on a display screen, and a selection area placement unit that places selectable areas for the selection candidate text on the display screen in a manner that the selectable areas differ from a display area of the selection candidate text.

According to an embodiment of the present disclosure, there is provided an information processing method including extracting selection candidate text from a text string displayed on a display screen, and placing selectable areas for the selection candidate text on the display screen in a manner that the selectable areas differ from a display area of the selection candidate text.

According to an embodiment of the present disclosure, there is provided a program causing a computer to function as a text extraction unit that extracts selection candidate text from a text string displayed on a display screen, and a selection area placement unit that places selectable areas for the selection candidate text on the display screen in a manner that the selectable areas differ from a display area of the selection candidate text.

According to one or more embodiments of the present disclosure as described above, a user is able to more easily select text displayed on a display screen.

BRIEF DESCRIPTION OF THE DRAWINGS

FIG. 5 is an explanatory diagram illustrating an exemplary placement of selectable areas on a display screen according to the same embodiment;

FIG. 6 is an explanatory diagram illustrating an exemplary placement of selectable areas on a display screen according to the same embodiment;

FIG. 7 is an explanatory diagram illustrating an exemplary placement of selectable areas on a display screen according to the same embodiment;

FIG. 8 is an explanatory diagram illustrating an exemplary placement of selectable areas on a display screen according to the same embodiment;

DETAILED DESCRIPTION OF THE EMBODIMENT(S)

Figure 1:
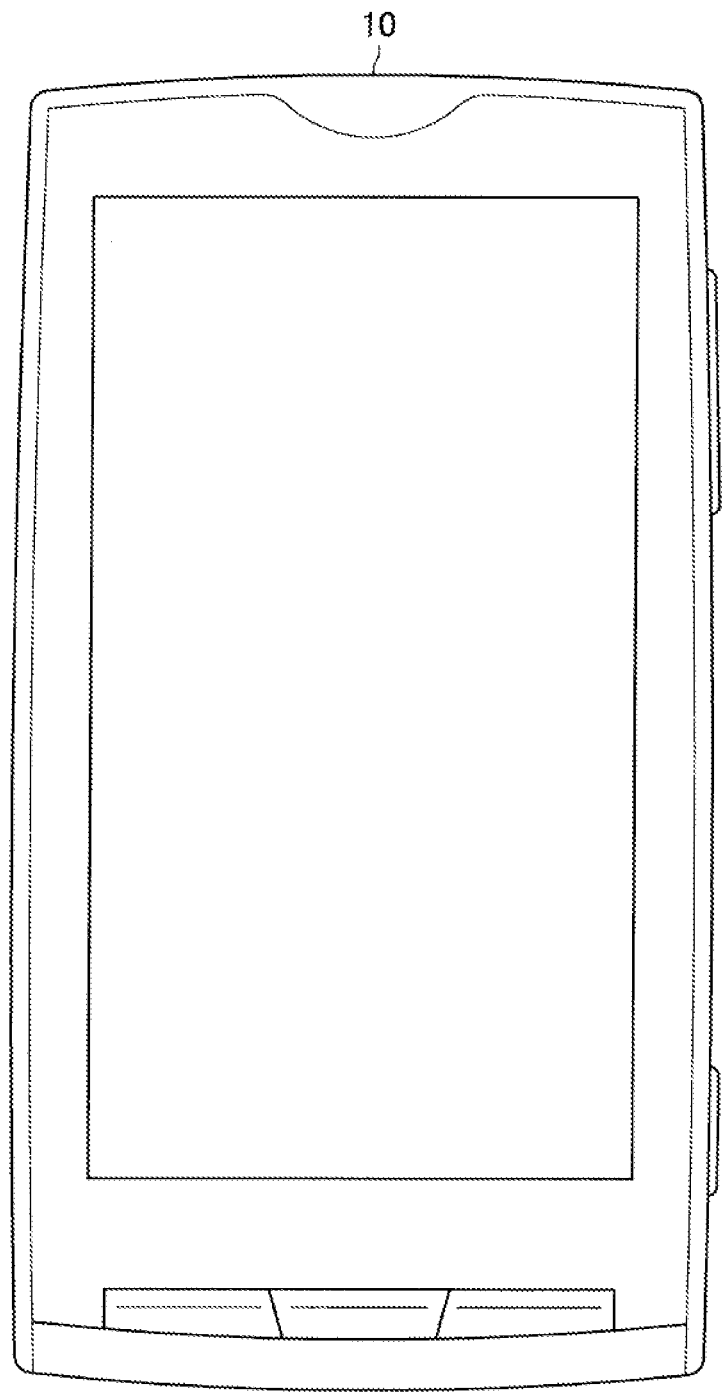
FIG. 1 is an exterior illustration of a mobile device 10 according to a first embodiment of the present disclosure.

Hereinafter, preferred embodiments of the present disclosure will be described in detail and with reference to the attached drawings. The present disclosure may be carried out in various embodiments, examples of which are described in detail from sections (1. Detailed description of first embodiment) to (2. Detailed description of second embodiment). In addition, the detailed description of the embodiments in this section will be given in the order indicated below.

1. Detailed description of first embodiment
1-1. Basic configuration
1-2. Configuration
1-3. Action
1-4. Advantageous effects
2. Detailed description of second embodiment
2-1. Basic configuration
2-2. Configuration
2-3. Action
2-4. Advantageous effects
3. Exemplary modifications Note that, in this specification and the appended drawings, structural elements that have substantially the same function and structure are denoted with the same reference numerals, and repeated explanation of these structural elements is omitted.

In addition, in this specification and the appended drawings, a plurality of structural elements that have substantially the same function and structure might be denoted with the same reference numerals suffixed with different letters or numbers to be discriminated from each other as necessary, like a mobile device 10a and a mobile device 10b. However, when not having to be particularly discriminated from each other, the plurality of structural elements that have substantially the same function and structure are only denoted with the same reference numerals. For example, when not having to be particularly discriminated from each other, the mobile device 10a and the mobile device 10b are simply referred to as the mobile device 10.

1. Detailed Description of First Embodiment

1-1. Basic Configuration

First, a basic configuration of a mobile device 10 (information processing apparatus) according to the first embodiment will be described with reference to FIG. 1. As illustrated in FIG. 1, the mobile device 10 is a mobile information processing client that includes a display. The mobile device 10 may be a mobile phone such as a smartphone, a tablet, a personal digital assistant (PDA), a digital camera, a wristwatch, or game console, for example.

Figure 2:
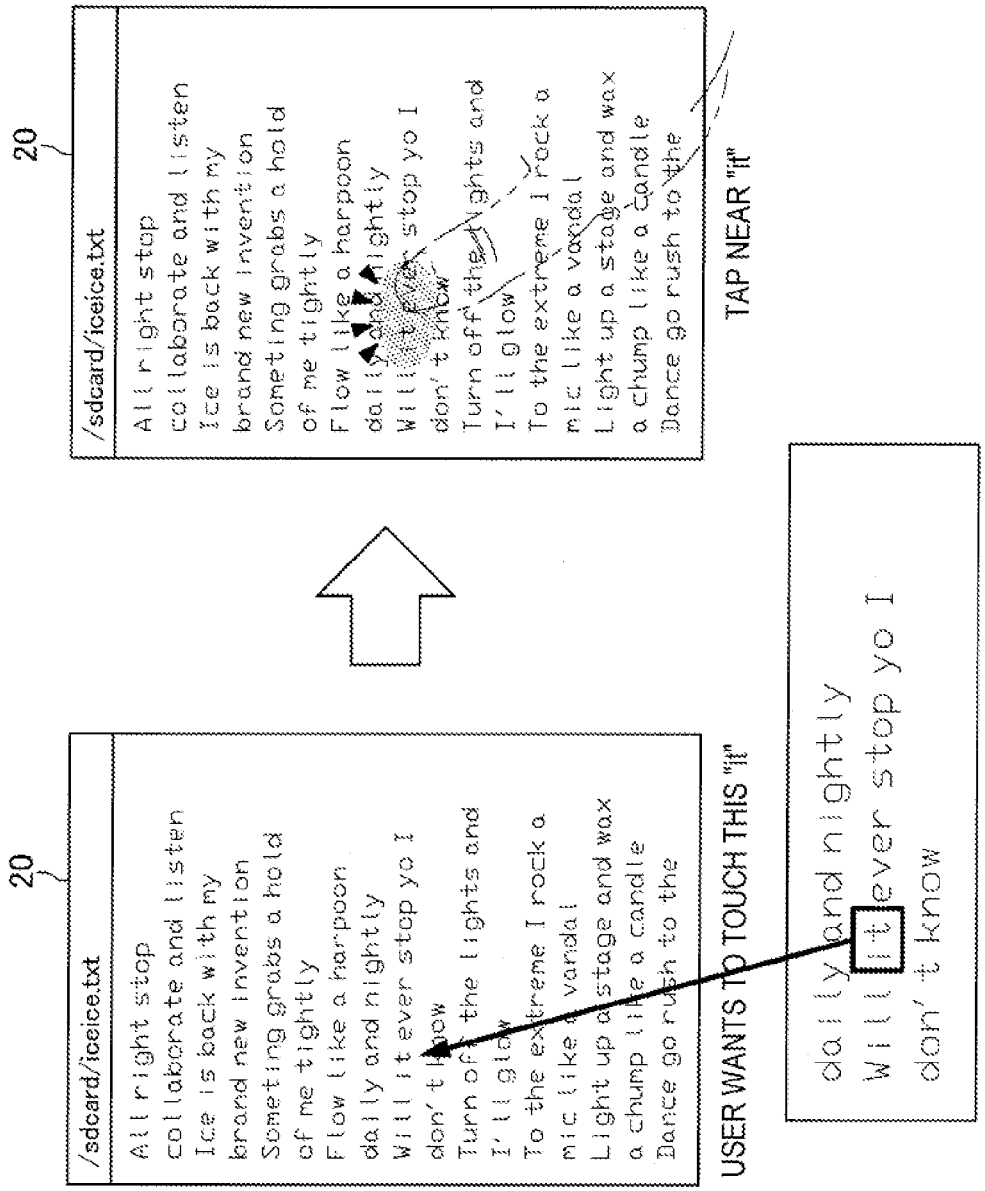
FIG. 2 is an explanatory diagram illustrating exemplary operation of the mobile device 10 according to the same embodiment.

The mobile device 10 is capable of displaying a display screen 20 that includes text, as illustrated in FIG. 2, for example. The mobile device 10 also includes a touch panel device, and is capable of detecting a position on the display screen 20 that a user has tapped with a finger.

Additionally, the mobile device 10 is capable of implementing software for editing text such as notes, for example. Furthermore, the mobile device 10 is capable of implementing software for displaying a software keyboard on the display screen 20, and/or software for recognizing characters written by hand on the display screen 20. For example, the user may freely input and edit text strings by using a software keyboard displayed on the display screen 20 or by handwriting input with respect to a handwriting input screen.

The mobile device 10 may also include a function of recognizing speech picked up by a microphone or the like provided in the mobile device 10, for example. Furthermore, the mobile device 10 is capable of converting recognized speech into a text string, and displaying the converted text string on the display screen 20. Note that the mobile device may also conduct speech recognition on the basis of electronic data in which speech is recorded, and subsequently convert the recognized speech into a text string.

Note that in this specification, an example of the mobile device 10 being used in a situation in which the user corrects an input text string will be mainly described as an example hereinafter. However, the mobile device 10 is not limited to such an example, and is similarly usable in a situation in which the user selects and copies partial text from a text string displayed on the display screen 20, such as a web page displayed by a web browser, for example.

—Hardware Configuration—

Figure 3:
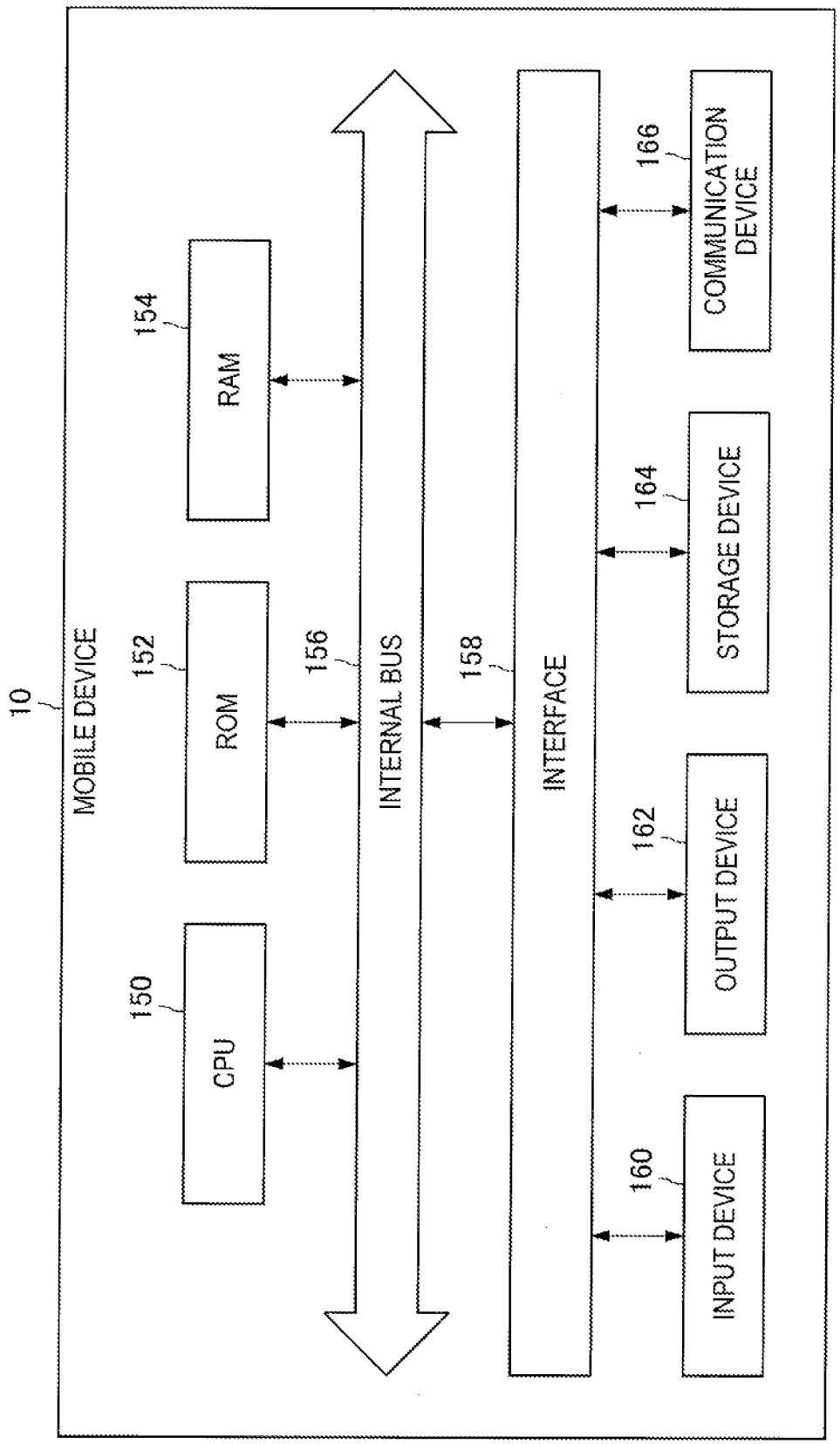
FIG. 3 is an explanatory diagram illustrating a hardware configuration of the mobile device 10 according to the same embodiment.

Note that the mobile device 10 has a hardware configuration as illustrated in FIG. 3, for example. As illustrated in FIG. 3, the mobile device 10 includes a CPU (Central Processing Unit) 150, ROM (Read Only Memory) 152, RAM (Random Access Memory) 154, an internal bus 156, an interface 158, an input device 160, an output device 162, a storage device 164, and a communication device 166.

The CPU 150 is configured as an example of a control unit 100 to be described later. The CPU 150 functions as an arithmetic processing unit and a controller device, and controls overall operations in the mobile device 10 according to various programs. The CPU 150 may be a microprocessor.

The ROM 152 stores therein programs and operational parameters which are used by the CPU 150. The RAM 154 temporarily stores therein the programs used and executed by the CPU 150, parameters appropriately varying in executing the programs, and the like. The CPU 150, the ROM 152, and the RAM 154 are connected to each other via the internal bus 156 configured of a CPU bus or the like.

The interface 158 connects the input device 160, the output device 162, the storage device 164, and the communication device 166 with the internal bus 156. For example, the input device 160 exchanges data with the CPU 150 and the like through the interface 158 and the internal bus 156.

The input device 160 includes: an input mechanism used by the user for imputing information, such as a touch panel, a button, a microphone, or a switch; an input control circuit configured to generate an input signal based on user input and to output the signal to the CPU 150; and the like. By manipulating the input device 160, the user of the mobile device 10 can input various data into the information processing apparatus 10 and instruct the mobile device 10 to perform a processing operation.

The output device 162 includes a display device such as a liquid crystal display (LCD: Liquid Crystal Display) device, an OLED (Organic Light Emitting Diode) device, or a lamp. Further, the output device 162 includes a sound output device such as a speaker. For example, the display device displays a captured image, a generated image, and the like. In contrast, the sound output device outputs sound converted from sound data or the like.

The storage device 164 is a device for data storage, such as a hard disk. The storage device 164 may include a storage medium, a recording device which records data in a storage medium, a reader device which reads data from a storage medium, a deletion device which deletes data recorded in a storage medium, and the like. The storage device 164 stores therein the programs executed by the CPU 150 and various data.

The communication device 166 is a communication interface configured of a communication device or the like for connecting to a communication network such as a public network or the Internet. The communication device 166 may also be a communication device supporting a wireless LAN (Local Area Network), a communication device supporting LTE (Long Term Evolution), or a wired communication device configured to perform communication in a wired manner.

1-2. Configuration

Figure 4:
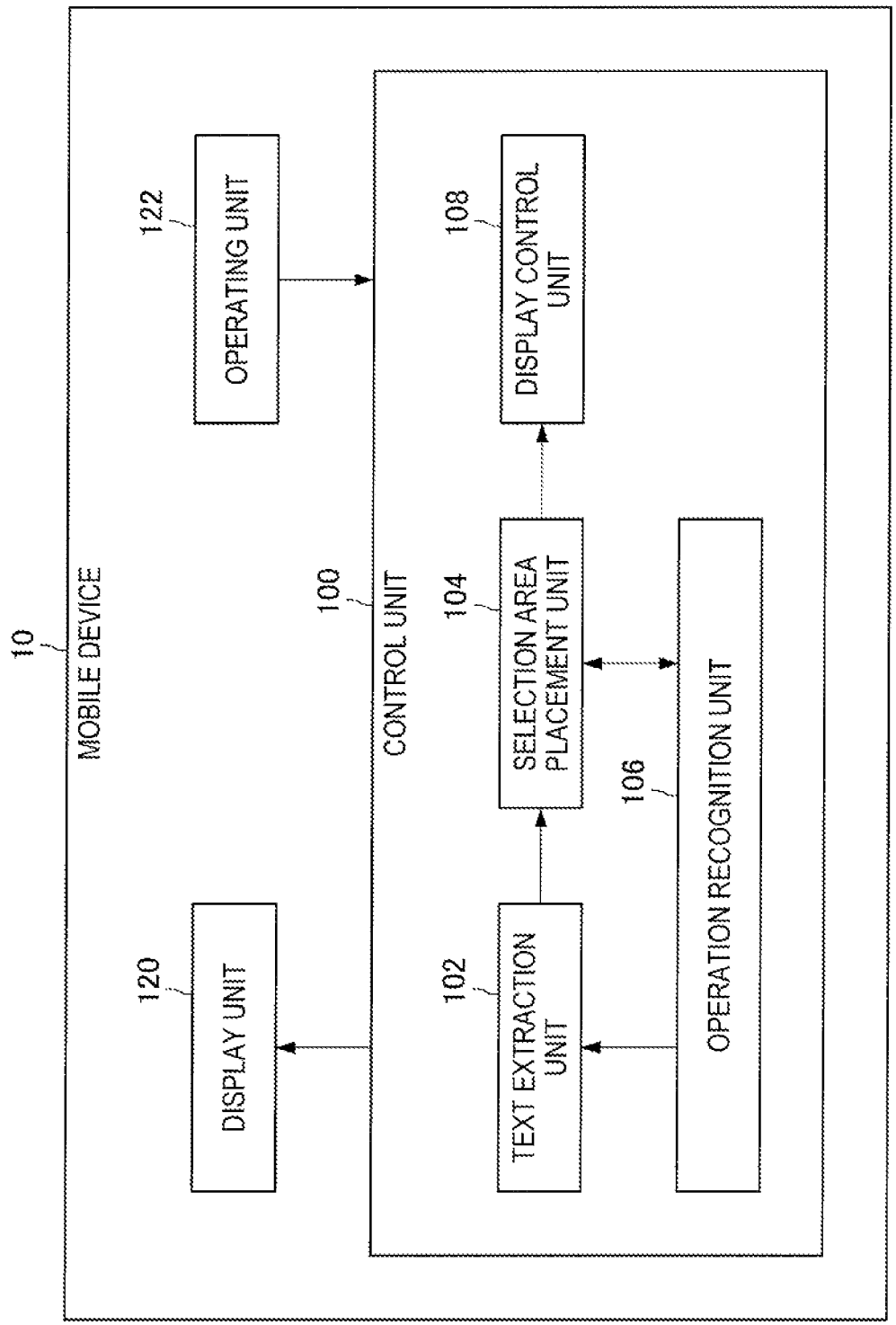
FIG. 4 is a function block diagram illustrating a configuration of the mobile device 10 according to the same embodiment.

Hereinafter, a basic configuration of a mobile device 10 according to the first embodiment will be described. Subsequently, a configuration according to the first embodiment will be described in detail. FIG. 4 is a function block diagram illustrating a configuration of the mobile device 10 according to the first embodiment. As illustrated in FIG. 4, a mobile device 10 according to the first embodiment includes a control unit 100, a display unit 120, and an operating unit 122. Additionally, the control unit 100 includes a text extraction unit 102, a selection area placement unit 104, an operation recognition unit 106, and a display control unit 108.

The control unit 100 includes a functional of generally controlling the action of the mobile device 10 by using hardware such as the CPU 150 and RAM 154 built into the mobile device 10. For example, the control unit 100 controls the action of the display unit 120 and the operating unit 122.

The text extraction unit 102 extracts selection candidate text from a text string displayed on the display screen 20. More specifically, the text extraction unit 102 extracts selection candidate text on the basis of the position where the user performed a touch operation on the display screen 20. For example, the text extraction unit 102 may extract first text closest to the position tapped by the user on the display screen 20, and one or more second text neighboring the first text, as respective selection candidate text. Herein, text may a single word, or a compound containing two or more words. Also, in the case in which the text string is in a language such as Japanese or Chinese, for example, text may be a morpheme obtained after morphological analysis is conducted by the text extraction unit 102, or a character string containing two or more morphemes.

In the example illustrated in the diagram on the right side of FIG. 2, for example, in the case in which the user taps near the word "it" from the text string displayed on the display screen 20, the text extraction unit 102 may extract "it" and surrounding words neighboring "it" as selection candidate text.

The text extraction unit 102 may also vary the selection candidate text to extract on the basis of whether the left hand or the right hand tapped the display screen 20. For example, in the case in which the operating unit 122 discussed later detects whether a tap was performed by the left hand or the right hand on the basis of information such as a detection result of a finger pressure shape on the display screen 20, the text extraction unit 102 may treat the tapped position on the display screen 20 as a reference, and extract just the text on the opposite side of the tapping hand, or just the text on the same side of the tapping hand.

The selection area placement unit 104 places selectable areas for the selection candidate text extracted by the text extraction unit 102 on the display screen 20, so as to differ from the selection candidate text display area. More specifically, the selection area placement unit 104 places selectable areas for the selection candidate text on the display screen 20 that are more enlarged than the selection candidate text display area.

FIGS. 5 to 8 are explanatory diagrams illustrating an exemplary display in which the display control unit 108 discussed later superimposes onto the display screen 20 a selection area display image, which is an image indicating placed selectable areas. Note that FIGS. 5 to 8 illustrate an example for the case in which the text extraction unit 102 extracts "it" and words near "it" as selection candidate text, and the selection area placement unit 104 places a selectable area for each extracted word.

Note that in FIGS. 5 to 8, the selection area display image is simplified and expressed as non-transparent. However, in actual practice the display control unit 108 may display the selection area display image in a semi-transparent color. For this reason, the user is able to see through to the text string positioned in the range of the selection area display image on the display screen 20. Also, although FIG. 5 illustrates an example of placing selectable areas for 9 words, for example, the configuration is not limited to such an example, and it is also possible to place selectable areas for an arbitrary number of words, such as 5 or 15, for example.

As illustrated in FIGS. 5 to 8, the selection area placement unit 104 may place selectable areas for selection candidate text on the display screen 20 that are more enlarged than the display size of the text displayed on the display screen 20.

Also, as illustrated in FIG. 5, the selection area placement unit 104 may also place selectable areas for the selection candidate text below the display position of the selection candidate text. Also, as illustrated in FIG. 6, the selection area placement unit 104 may also place selectable areas for the selection candidate text above the display position of the selection candidate text. A potential advantageous effect of these exemplary placements is that, since the image indicating the selectable areas for the selection candidate text is displayed offset by a fixed degree from the display position of the selection candidate text on the display screen 20, visibility is ensured for the selection candidate text and nearby text being displayed on the display screen 20.

In addition, as illustrated in FIG. 7, the selection area placement unit 104 may also place selectable areas for the selection candidate text on the display screen 20 centered on the Y coordinate value, or in other words the coordinate value in the vertical direction of the display screen 20, of the position tapped by the user. A potential advantageous effect of this exemplary placement is that, since the image indicating the selectable areas for the selection candidate text is displayed not far distant from the display position of the selection candidate text, the user is able to select arbitrary selection candidate text without moving his or her finger very far from the tapped position, and thus make a selection more easily.

FIG. 8 is an explanatory diagram illustrating an example placement in which the selection area placement unit 104 arranges selectable areas for the selection candidate text on the basis of whether the left hand or the right hand tapped the display screen 20. For example, in the case in which the user's left hand taps the display screen 20, the selection area placement unit 104 may place selectable areas for the selection candidate text like the exemplary placement illustrated in FIG. 8. Typically, when a user attempts to tap with the left hand, for example, there is a possibility of unintentionally tapping a position slightly to the left of the user's intended position. For this reason, according to this exemplary placement, the tapped position is treated as a reference, and selectable areas for text positioned on the opposite side of the tapping hand (that is, the right side) are placed. This has the advantage of reducing mistaken selections by the user.

However, the configuration is not limited to the above example, and the selection area placement unit 104 may place selectable areas for the selection candidate text like the exemplary placement illustrated in FIG. 8 in the case in which the user's right hand taps the display screen 20. According to this exemplary modification, the tapped position is treated as a reference, and selectable areas for text positioned on the side of the tapping hand (that is, the right hand) are placed. This has the advantage of enabling the user to easily select selection candidate text with the right hand in the case in which the user is holding and operating the mobile device 10 one-handed with the right hand, for example. One reason for the above is because human fingers have a tendency to readily bend in the direction of the palm.

In addition, the selection area placement unit 104 may also place selectable areas for the individual selection candidate text in an arrangement according to the arrangement of the selection candidate text displayed on the display screen 20. For example, as "ever" is placed to the right of "it" in the examples illustrated in FIGS. 5 to 8, the selection area placement unit 104 may place selectable areas for the individual selection candidate text in the same arrangement as the text string displayed on the display screen 20.

In addition, the selection area placement unit 104 may also place selectable areas for the selection candidate text in an arc on the basis of the position at which a tap operation was performed on the display screen 20. For example, the selection area placement unit 104 may place selectable areas for the selection candidate text in an arc or elliptical circumference centered near a joint of the hand that first tapped the display screen 20 (such as the thumb, for example), or in an arc or elliptical circumference in the opposite direction. According to this exemplary placement, the user is able to select arbitrary selection candidate text by simply moving a finger in an arc from the tapped position, without moving the arm. For this reason, the user may be able to touch selection candidate text easily, and experience less physical fatigue.

In addition, the selection area placement unit 104 may also place a selectable area for the text closest to the tapped position on the display screen 20 that is larger than the selectable areas for other text. For example, in the example illustrated in FIG. 5, in the case in which the user taps near the word "it", the selection area placement unit 104 may place a selectable area 200*a* for the word "it" that is larger than the selectable areas for other words, such as the selectable area 202*a* for the word "daily", for example. Generally, it is anticipated that the user will want to select the word closest to the tapped position. For this reason, by placing a selectable area for the word closest to the tapped position that is larger than the selectable areas for other words, the user is able to more easily select the words he or she wants to select.

In addition, the selection area placement unit 104 may also place a selectable area for certain text that is larger than the selectable areas for other text, on the basis of past usage results. For example, in the exemplary placement illustrated in FIG. 5, in the case in which a user has selected the upper-left selectable area 202*a* among the nine selectable areas more times than the other selectable areas, the selection area placement unit 104 may place an upper-left selectable area 202*a* that is larger than the other selectable areas. This exemplary placement has an advantage in that, since a selectable area existing at a position with a higher probability of being tapped by a user is placed with a larger size, a user who tends to tap approximately the same position every time is able to make a selection more easily.

In addition, in the case in which the user moves a finger over the display screen 20 with the finger still touching the display screen 20, the selection area placement unit 104 may move the selectable areas for the selection candidate text according to the change in finger position. For example, in the case in which the user moves a finger upward over the display screen 20 with the finger still touching the display screen 20, the selection area placement unit 104 may move the selectable areas for the selection candidate text upward on the display screen 20 according to the finger movement. According to this exemplary modification, since the selectable areas move, the position of the selection area display image superimposed by the display control unit 108 discussed later also moves, enabling a clearer display of the text string positioned at the place where the selection area display image was being displayed. For this reason, the user is able to easily and more clearly check the original text string by simply moving his or her finger over the display screen 20.

The operation recognition unit 106 recognizes user touch operations on the display screen 20. For example, in the case in which the user taps the display screen 20, the operation recognition unit 106 may recognize that the user has selected selection candidate text that corresponds to the selectable area existing at the tapped position. In the example illustrated in FIG. 5, in the case in which the user taps inside the selectable area 200*a* for the word "it", for example, the operation recognition unit 106 may recognize that the user has selected the word "it".

Figure 9:
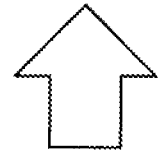
FIG. 9 is an explanatory diagram illustrating an exemplary operation of removing a selection area display image displayed on a display screen according to the same embodiment.

Also, as illustrated in FIG. 9, in the case in which the user taps an area 204 other than the selectable areas for selection candidate text on the display screen 20, the operation recognition unit 106 may recognize that the user has not selected any selection candidate text. Subsequently, in the case in which the operation recognition unit 106 recognizes that the user has not selected any selection candidate text, the selection area placement unit 104 may remove the placed selectable areas, as illustrated by the drawing on the right in FIG. 9.

Note that in the case in which the user newly taps the display screen 20 after removing the selectable areas for the selection candidate text, the text extraction unit 102 may extract selection candidate text on the basis of the newly tapped position from the displayed text string. Subsequently, the selection area placement unit 104 may place selectable areas for the extracted selection candidate text on the display screen 20.

The display control unit 108 superimposes a selection area display image indicating selectable areas for selection candidate text onto the display screen 20. For example, the display control unit 108 may also display the selection area display image in the same area as the selectable areas for the selection candidate text. The selection area display image may also include the selection candidate text, as illustrated in FIG. 5, for example. A potential advantageous effect is that the user is able to clear recognize the selectable area corresponding to each selection candidate text. Also, since the selection area display image is basically superimposed onto the display screen 20 in a semi-transparent color, the user is able to select any of the selection candidate text while checking the text string itself being displayed on the display screen 20.

The display control unit 108 may also differentiate the colors of all or part of the selection area display image, as illustrated by the shading in FIGS. 5 to 8, for example. Alternatively, the display control unit 108 may display all of the selection area display image in the same color.

The display unit 120 displays the display screen 20 according to instructions from the display control unit 108.

The operating unit 122 receives various operations from the user. For example, the operating unit 122 receives text input operations via a software keyboard displayed on the display screen 20, text input operations via speech, or user touch operations on the display screen 20.

Note that, according to the first embodiment, it is also possible to provide a computer program causing hardware such as the CPU 150, ROM 152, and RAM 154 built into the mobile device 10 to exhibit the same functionality as the respective components of above mobile device 10. Also, a storage medium having such a computer program stored therein is also provided.

However, a configuration according to the first embodiment is not limited to the foregoing configuration. For example, one or both of the display unit 120 and the operating unit 122 may also be provided in another device, without being included in the mobile device 10.

1-3. Action

Figure 10:
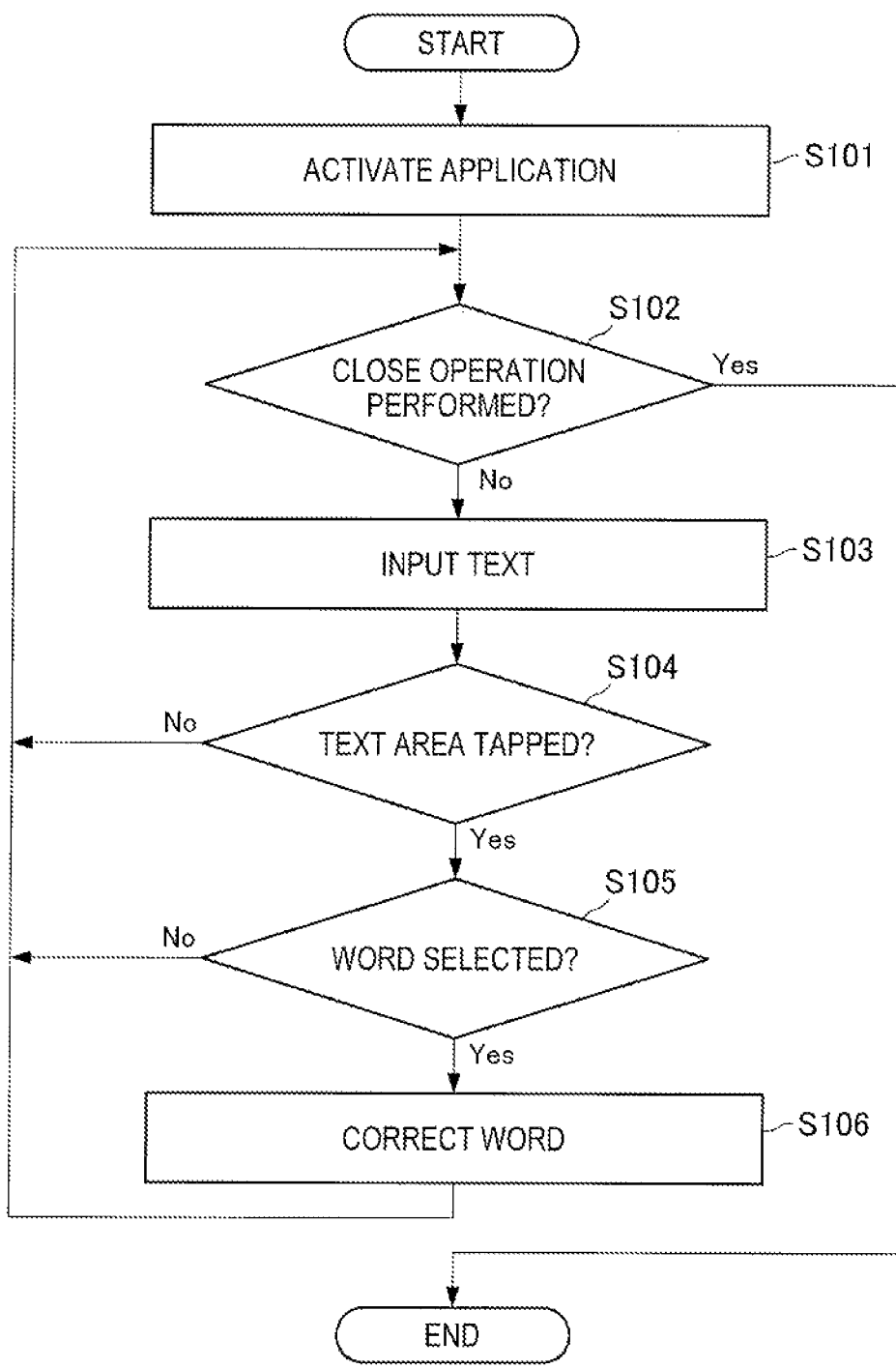
FIG. 10 is a flowchart illustrating action according to the same embodiment.

The above thus describes a configuration according to the first embodiment. Next, action according to the first embodiment will be described. FIG. 10 is a flowchart illustrating exemplary action according to the first embodiment.

As illustrated in FIG. 10, first, the control unit 100 activates a designated application for inputting text, as a result of a user operation on the operating unit 122 (S101). Note that the application may be stored in the mobile device 10, or stored in another device. In the case of storing the application in another device, the mobile device 10 may instruct that device to activate the application via wireless communication, for example.

Subsequently, the control unit 100 determines whether or not the user has performed a close operation to close the application (S102). In the case in which the user has performed a close operation (S102: Yes), the control unit 100 closes the application.

On the other hand, in the case in which the user has not performed a close operation (S102: No), the operating unit 122 receives input of a text string by the user using a software keyboard, speech, or the like, for example. Subsequently, the display control unit 108 causes the display screen 20 to display the input text string (S103).

Subsequently, the control unit 100 determines whether or not the user has tapped the display area of the text string on the display screen 20 (S104). In the case in which the user has not performed a tap (S104: No), the control unit 100 repeats the action of S102 again.

On the other hand, in the case in which the user has performed a tap (S104: Yes), first, the text extraction unit 102 extracts selection candidate text on the basis of the position on the display screen 20 at which the user performed the tap. The selection area placement unit 104 then places selectable areas for the selection candidate text on the display screen 20 that are more enlarged than the selection candidate text display area. The display control unit 108 then superimposes a selection area display image indicating selectable areas for selection candidate text onto the display screen 20.

Subsequently, the operation recognition unit 106 recognizes whether or not the user has selected one of the selectable areas placed on the display screen 20 (S105). In the case of recognizing that the user has not selected any of the selectable areas (S105: No), the control unit 100 repeats the action of S102 again.

On the other hand, in the case of recognizing that the user has selected one of the selectable areas (S105: Yes), the operation recognition unit 106 recognizes that the user has selected the selection candidate text corresponding to the selected selectable area. The operating unit 122 then receives the user's correction operation on the selected text (S106).

For example, first, the control unit 100 specifies correction candidates for the selected text according to a designated input prediction engine. Next, the display control unit 108 causes the display screen 20 to display a pull-down menu for listing the correction candidate text. Subsequently, the operating unit 122 receives the user's selection operation on the pull-down menu. A potential advantageous effect of this exemplary operation is that, since the user is able to correct text as desired by simply tapping and selecting correction candidate text displayed in a pull-down menu, for example, the user is able to correct text more quickly.

Alternatively, the display control unit 108 may cause the display screen 20 to display a software keyboard, and then the operating unit 122 may receive input of corrected text by the user using the software keyboard.

After that, the control unit 100 repeats the action of S102 again.

1-4. Advantageous Effects

As described above with reference to FIGS. 4 and 10, for example, a mobile device 10 according to the first embodiment extracts selection candidate text from a text string displayed on a display screen 20, and then places selectable areas for the selection candidate text on the display screen 20 that are more enlarged than the selection candidate text display area. For this reason, since the mobile device 10 places selectable areas for text that the user desires to select that are larger than the display size of the text string, the user is able to more easily select selection candidate text.

For example, since the user is able to select text by tapping any position inside a selectable area corresponding to the desired text to select, it is possible to prevent the text to be selected from becoming obscured in the user's field of view by the user's finger or nail. Also, since the mobile device 10 places larger selectable areas for text, the user is able to more easily select the text he or she wants to select, even in the case in which the text displayed on the display screen has a small display size.

The mobile device 10 according to the first embodiment is also highly user-friendly, since the user does not have to perform an operation of selecting the position of a word by using a finger to finely adjust the positions of anchors displayed on the display screen like those used in the technology of the related art.

2. Detailed Description of Second Embodiment

The foregoing thus describes the first embodiment. As discussed above, in the first embodiment, the mobile device 10 places selectable areas for the selection candidate text on the display screen 20 that are more enlarged than the selection candidate text display area. As described next, according to the second embodiment, the mobile device 10 may also place selectable areas for selection candidate text along one of the edges of the display screen 20.

2-1. Basic Configuration

The basic configuration of a mobile device 10 according to the second embodiment is similar to the first embodiment. Consequently, description thereof is omitted herein.

2-2. Configuration

Figure 11:
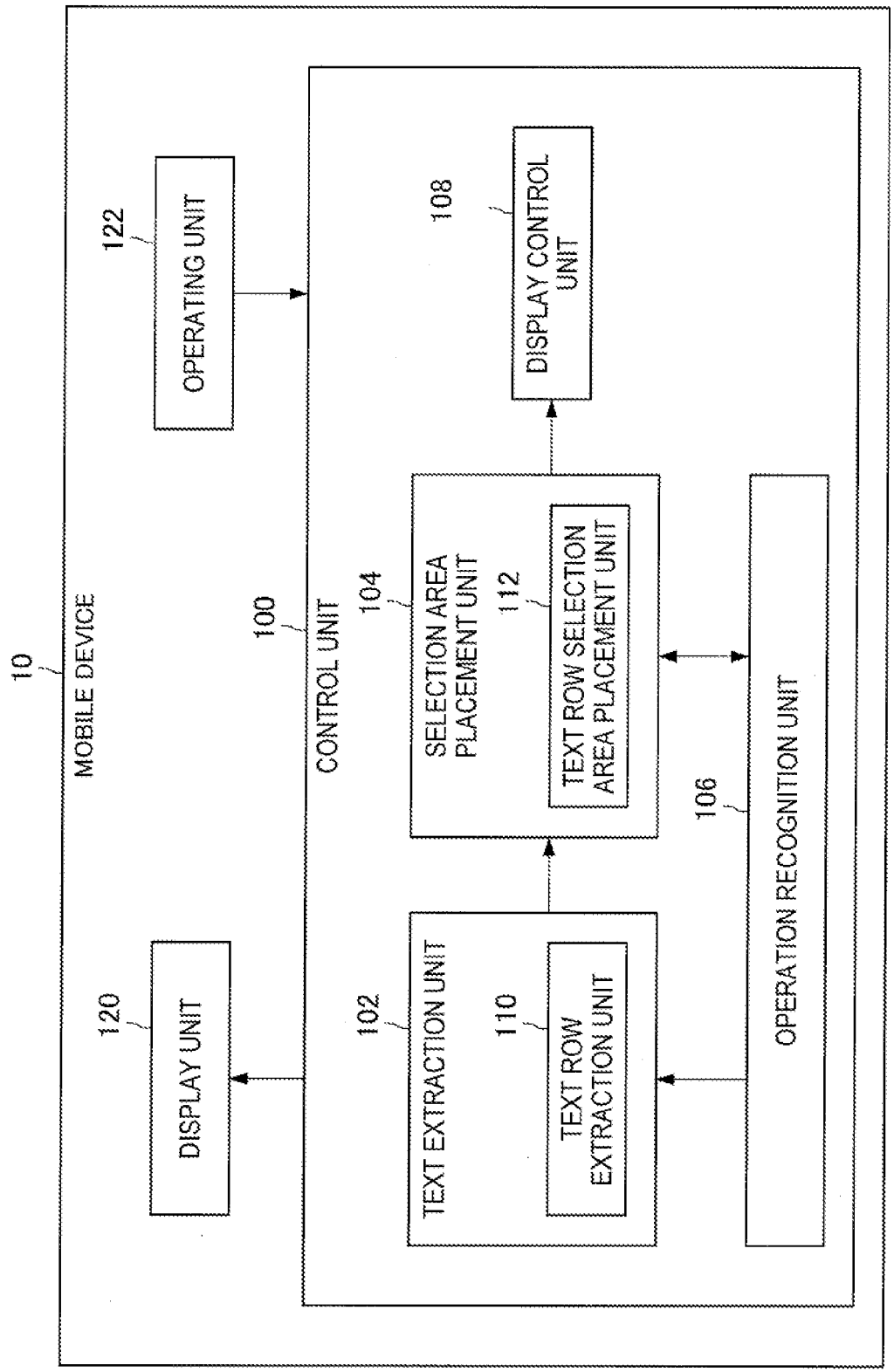
FIG. 11 is a function block diagram illustrating a configuration of the mobile device 10 according to a second embodiment of the present disclosure.

Next, a configuration of a mobile device 20 according to the second embodiment will be described. FIG. 11 is a function block diagram illustrating a configuration of the mobile device 10 according to the second embodiment. As illustrated in FIG. 11, compared to the first embodiment, a mobile device 10 according to the second embodiment newly includes a text row extraction unit 110 and a text row selection area placement unit 112.

The text row extraction unit 110 extracts one or more text rows on the basis of the position where the user performed a touch operation on a display screen 30. More specifically, the text row extraction unit 110 may extract a first text row, which is the text row closest to the position tapped by the user, and one or more second text rows near the first text row.

Figure 12:
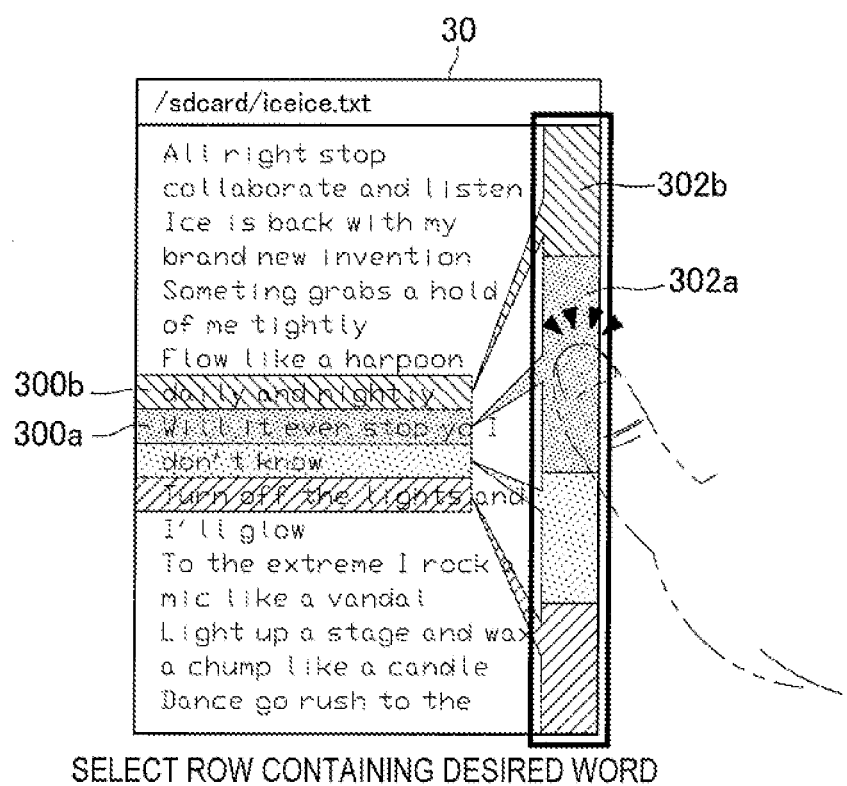
FIG. 12 is an explanatory diagram illustrating an exemplary placement of text row selection areas on a display screen according to the same embodiment.

For example, as illustrated in FIG. 12, in the case in which the user taps near the word "it" from the text string displayed on the display screen 30, the text row extraction unit 110 may extract a text row 300a that includes "it", as well as text rows surrounding the text row 300a, such as a text row 300b, for example.

Figure 13:
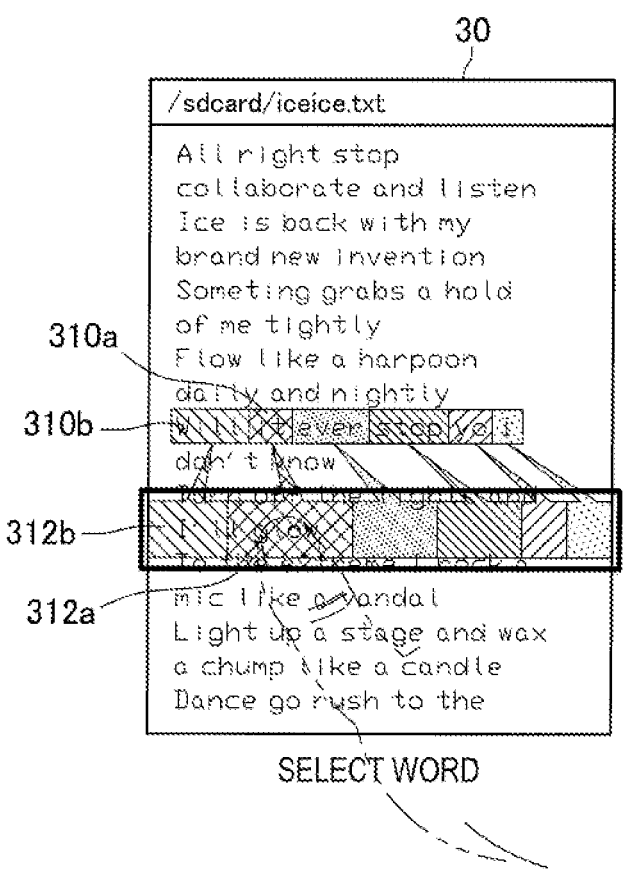
FIG. 13 is an explanatory diagram illustrating an exemplary placement of selectable areas on a display screen according to the same embodiment.

The text extraction unit 102 according to the second embodiment may extract individual text included in a text row extracted by the text row extraction unit 110 as selection candidate text. For example, in the example illustrated in FIG. 12, in the case in which the text row extraction unit 110 extracts the text row 300a that includes "it", the text extraction unit 102 may also extract individual words included in the text row 300a such as the word 310a, for example, as selection candidate text, as illustrated in FIG. 13.

The text row selection area placement unit 112 places text row selection areas that respectively correspond to text rows extracted by the text row extraction unit 110 on the display screen 30. More specifically, the text row selection area placement unit 112 may place a text row selection area for the first text row that is larger than the text row selection areas for one or more second text rows positioned near the first text row.

For example, as illustrated in FIG. 12, in the case in which the text row extraction unit 110 extracts the text row 300a and text rows surrounding the text row 300a, the text row selection area placement unit 112 may place a text row selection area 302a corresponding to the text row 300a that is larger than text row selection areas corresponding to the text rows surrounding the text row 300a, such as the text row selection area 302b, for example. Generally, it is anticipated that the user will want to select the text row closest to the tapped position. For this reason, by placing a text row selection area for the text row closest to the tapped position that is larger than the text row selection areas for other text rows, there is an advantage in that the user is able to more easily select the text row he or she wants to select.

Note that although FIG. 12 illustrates an example of placing text row selection areas for four rows, the configuration is not limited thereto. For example, the text row selection area placement unit 112 may also increase or decrease the number of rows of text row selection areas to place, according to the size of the user's finger or the size of the line spacing of the text string being displayed on the display screen 30.

In addition, the text row selection area placement unit 112 may also place a text row selection area for certain text that is larger than the text row selection areas for other text, on the basis of past usage results. More specifically, the text row selection area placement unit 112 may compute a range of Y coordinate values, or in other words a range of positions in the vertical direction of the display screen 30, that the user has tapped more times from among the placed text row selection areas, and then place a text row selection area positioned in the computed range of coordinate values that is larger than other text row selection areas. This exemplary placement has an advantage in that, since a text row selection area existing at a position with a higher probability of being tapped by a user is placed with a larger size, a user who tends to tap approximately the same position every time is able to make a selection more easily.

In addition, the text row selection area placement unit 112 may place text row selection areas along any one edge of the display screen 30. For example, as illustrated in FIG. 12, the text row selection area placement unit 112 may place text row selection areas 302 along the right edge of the display screen 30. Alternatively, the text row selection area placement unit 112 may place text row selection areas along any of the left edge, the top edge, and the bottom edge. According to this exemplary placement, since text row selection areas are placed along one of the edges of the display screen 30, when the user selects a text row, the user is able to select the text row he or she wants to select while keeping the text row being displayed on the display screen 30 minimally obscured by the user's finger. For this reason, the visibility of the text string being displayed is improved.

Additionally, in the case in which the operating unit 122 detects whether a tap was performed by the user's left hand or the right hand on the basis of information such as a detection result of a finger pressure shape on the display screen 30, for example, the text row selection area placement unit 112 may place text row selection areas along the edge on the side of the tapping hand. According to this exemplary placement, since the text row selection areas are placed along the right edge of the display screen 30 in the case in which the user is operating the mobile device 10 one-handed with the right hand, for example, the user is able to easily select the text row selection area he or she wants to select with the right hand.

The selection area placement unit 104 according to the second embodiment may place, on the display screen 30, selectable areas for each text included in a text row corresponding to a text row selection area placed by the text row selection area placement unit 112. More specifically, the selection area placement unit 104 may place, on the display screen 30, selectable areas for individual text included in a text row corresponding to a text row selection area selected by the user from among the placed text row selection areas. For example, as illustrated in FIG. 12, in the case in which the user selects the text row selection area 302a from among the placed text row selection areas, the selection area placement unit 104 may place selectable areas 312 for the individual text included in the text row corresponding to the text row selection area 302*a* on the display screen 30 as selectable areas, as illustrated in FIG. 13.

In addition, the selection area placement unit 104 may place a selectable area corresponding to first text closest to the position tapped first by the user on the text row corresponding to a text row selection area selected by the user, such that the selectable area is larger than selectable areas corresponding to second text other than the first text. For example, in the case in which the word "it" is the word closest to the X coordinate value, or in other words the position in the horizontal direction of the display screen 30, of a position tapped first by the user, the selection area placement unit 104 may place a selectable area 312*a* corresponding to the word "it" that is larger than the selectable areas corresponding to other words, such as the selectable area 312*b*, for example, as illustrated in FIG. 13. Generally, it is anticipated that the user will want to select the word closest to the tapped position. For this reason, according to this exemplary placement, the user is able to more easily select the word he or she wants to select from among placed selectable areas.

The operation recognition unit 106 according to the second embodiment may recognize that the user has selected a text row corresponding to a text row selection area existing at a position tapped on the display screen 30. For example, in the example illustrated in FIG. 12, in the case in which the user taps inside the text row selection area 302*a*, the operation recognition unit 106 may recognize that the user has selected the text row 300*a*.

Also, the operation recognition unit 106 may recognize that the user has selected a text row corresponding to a selectable area existing at a position tapped on the display screen 30. For example, in the example illustrated in FIG. 13, in the case in which the user taps inside the selectable area 312*a* for text, the operation recognition unit 106 may recognize that the user has selected the text 310*a* corresponding to the selectable area 312*a*, that is, the word "it".

Figure 14:
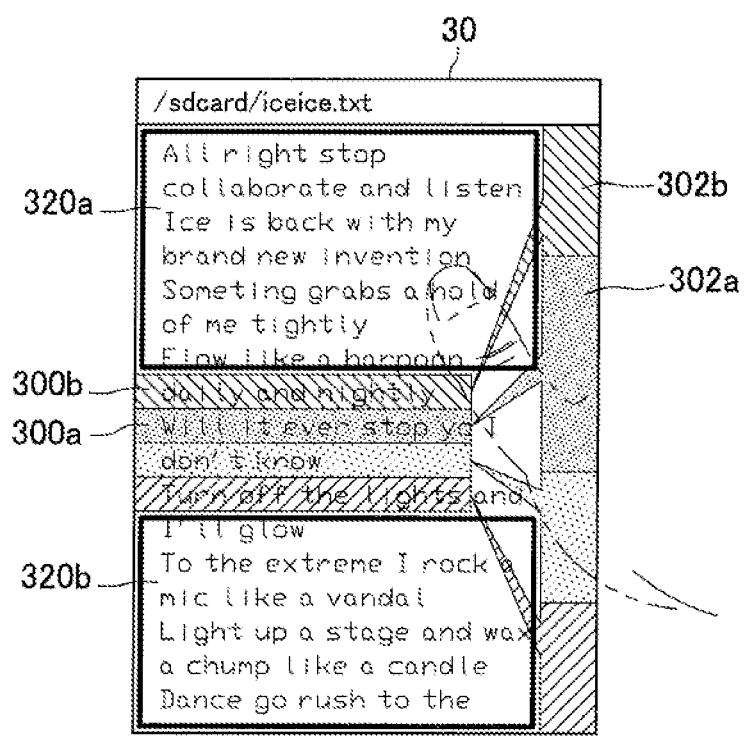
FIG. 14 is an explanatory diagram illustrating an exemplary operation of removing a selection area display image displayed on a display screen according to the same embodiment.

Also, as illustrated in FIG. 14, in the case in which the user taps a display area 320 other than the selection candidate text row display areas 300 and the text row selection areas 302 on the display screen 30, the operation recognition unit 106 may recognize that the user has not selected any selection candidate text row. Subsequently, in the case in which the operation recognition unit 106 recognizes that the user has not selected any selection candidate text row, the text row selection area placement unit 112 may remove the placed text row selection areas 302. Note that in the case in which the user newly taps the display screen 30 after removing the text row selection areas 302, the text row extraction unit 110 may extract one or more text rows on the basis of the newly tapped position. Subsequently, the text row selection area placement unit 112 may place text row selection areas that respectively correspond to the extracted text rows on the display screen 30.

Figure 15:
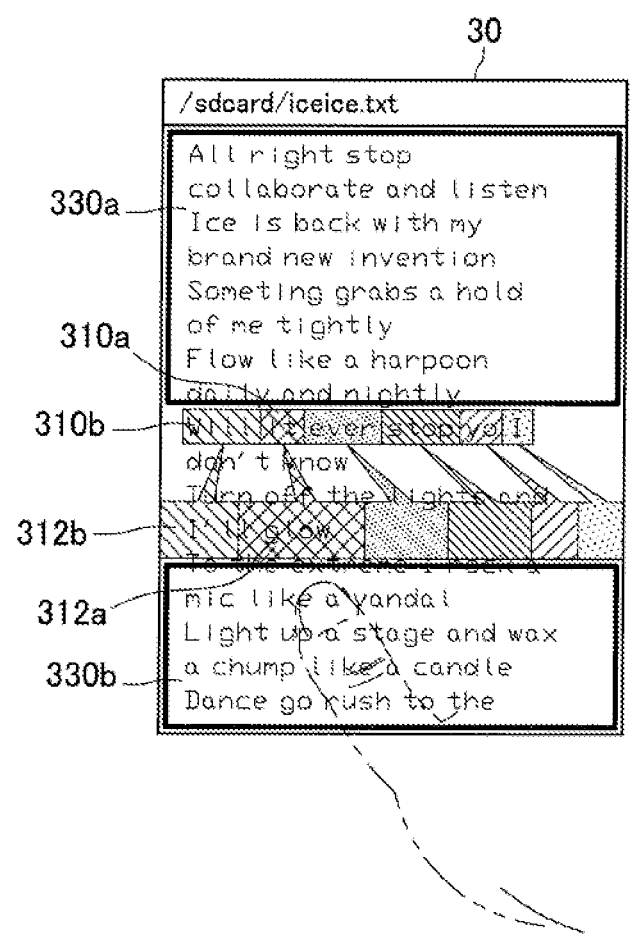
FIG. 15 is an explanatory diagram illustrating an exemplary operation of removing a selection area display image displayed on a display screen according to the same embodiment.

Also, as illustrated in FIG. 15, in the case in which the user taps a display area 330 other than the selection candidate text display areas 310 and the selectable areas 312 for text on the display screen 30, the operation recognition unit 106 may recognize that the user has not selected any selection candidate text row. Subsequently, in the case in which the operation recognition unit 106 recognizes that the user has not selected any text, the selection area placement unit 104 may remove the placed selectable areas 312.

The display control unit 108 according to the second embodiment may superimpose a text row selection area display image indicating placed text row selection areas onto the display screen 30, as illustrated in FIG. 12, for example. For example, the display control unit 108 may also differentiate the colors of all or part of the text row selection area display image for display on the display screen 30, as illustrated by the shading in FIG. 12. A potential advantageous effect is that the user becomes able to clearly and intuitively recognize the text row selection areas corresponding to extracted text rows.

In addition, the display control unit 108 may also display the text row selection area display image on the display screen 30 in a semi-transparent color. An advantageous effect is that, even in the case in which the text string is being displayed behind the text row selection area display image, the user is able to select the text row he or she wants to select while checking the text string being displayed underneath.

In addition, the display control unit 108 may highlight text corresponding to a text row selection area with a semi-transparent color, for example, like the text row 300*a* and the text row 300*b* in FIG. 12, for example.

Note that the function of each structural element of a mobile device 10 according to the second embodiment is generally similar to the first embodiment, except as described above.

2-3. Action

Figure 16:
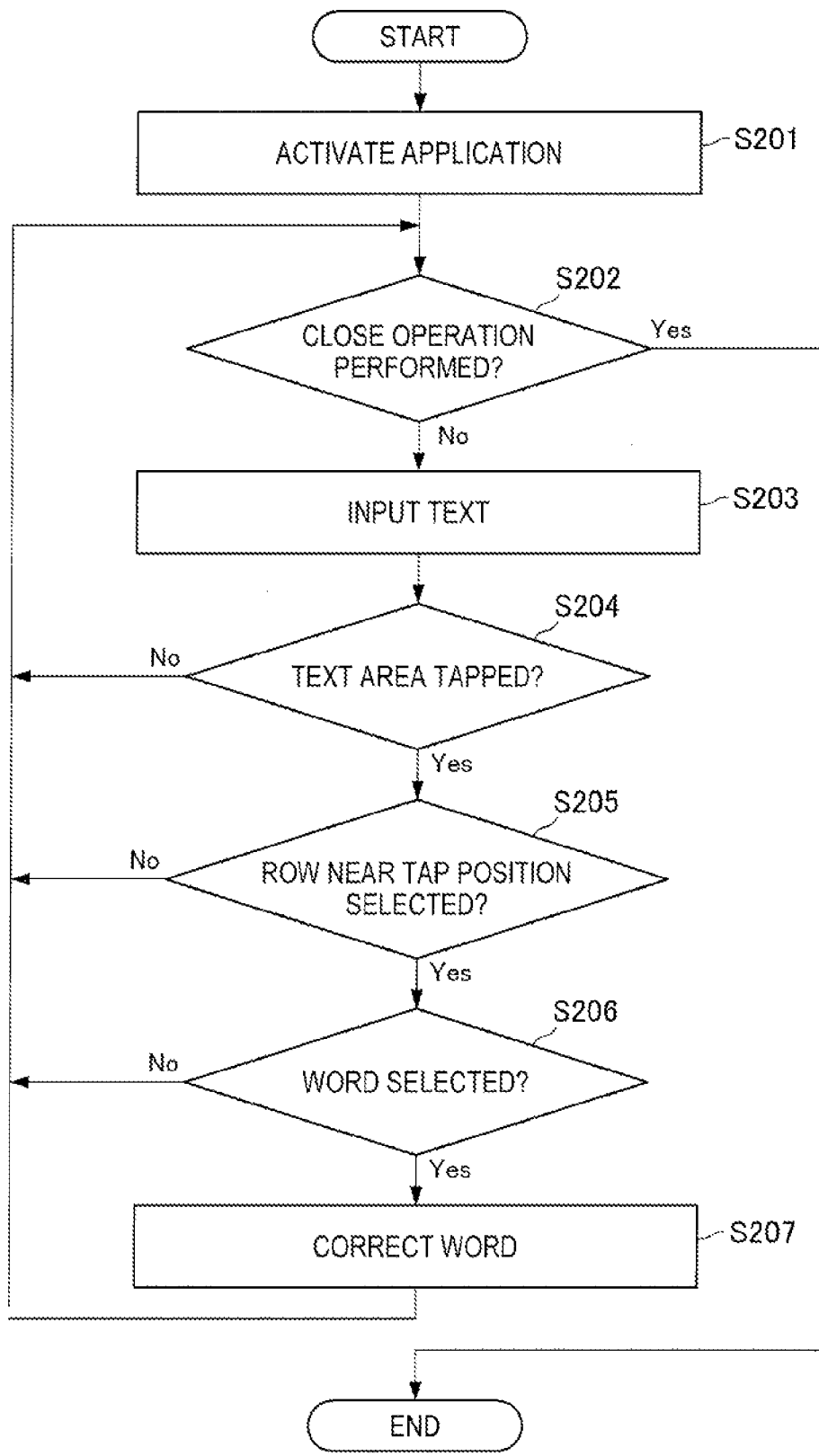
FIG. 16 is a flowchart illustrating action according to the same embodiment.

The above thus describes a configuration according to the second embodiment. Next, action according to the second embodiment will be described. FIG. 16 is a flowchart illustrating action according to the second embodiment. Note that the action from S201 to S203 is similar to the action from S101 to S103 according to the first embodiment.

After S203, the control unit 100 determines whether or not the user has tapped a displayed text area on the display screen 30 (S204). In the case in which the user has not performed a tap (S204: No), the control unit 100 repeats the action of S202 again.

On the other hand, in the case in which the user has performed a tap (S204: Yes), first, the text row extraction unit 110 extracts text rows on the basis of the position on the display screen 30 at which the user performed the tap. Subsequently, the text row selection area placement unit 112 places text row selection areas that respectively correspond to the extracted text rows along one of the edges of the display screen 30. The display control unit 108 then superimposes a text row selection area display image indicating text row selection areas on the display screen 30.

Subsequently, the operation recognition unit 106 recognizes whether or not the user has selected one of the text row selection areas placed on the display screen 30 (S205). In the case of recognizing that the user has not selected any of the text row selection areas (S205: No), the control unit 100 repeats the action of S202 again.

On the other hand, in the case of recognizing that the user has selected one of the text row selection areas (S205: Yes), first, the text extraction unit 102 extracts individual text included in the text row corresponding to the text row selection area selected by the user as selection candidate text. Subsequently, the selection area placement unit 104 places a selectable area for each extracted selection candidate text on the display screen 30. The display control unit 108 then superimposes a selection area display image indicating selectable areas for selection candidate text onto the display screen 30.

Note that action in S206 and thereafter is generally similar to the action from S105 to S106 according to the first embodiment. Consequently, description thereof is omitted herein.

2-4. Advantageous Effects

As described above with reference to FIGS. 11 and 16, for example, a mobile device 10 according to the second embodiment extracts text rows from a text string displayed on a display screen 30, and then places text row selection areas that respectively correspond to the extracted text rows along one of the edges of the display screen 30. For this reason, when the user selects a text row, the user is able to easily select the text row he or she wants to select, without the text string being displayed on the display screen 30 becoming obscured by the user's finger or nail.

In addition, the mobile device 10 extracts individual text included the text row corresponding to the text row selection area selected by the user as selection candidate text, and places selectable areas for the extracted selection candidate text on the display screen 30. For this reason, by simply tapping a selectable area for selection candidate text placed on the display screen 30, the user is able to easily select the text he or she wants to select from a text row that the user has selected.

3. Exemplary Modifications

Note that although the foregoing describes preferred embodiments of the present disclosure in detail and with reference to the attached drawings, the present disclosure is not limited to such examples. It is clear to persons ordinarily skilled in the technical field to which the present disclosure belongs that various modifications or alterations may occur insofar as they are within the scope of the technical ideas stated in the claims, and it is to be understood that such modifications or alterations obviously belong to the technical scope of the present disclosure.

3-1. Exemplary Modification 1

For example, the mobile device 10 may also extract text having a high probability of input error from an input text string according to a designated input prediction engine, and then emphasize the extracted text on a display screen 40. More specifically, in the case in which a text string is input via speech recognition, for example, the mobile device 10 may extract text having a high probability of input error every time the speech recognition process is performed, such as in phrase units, for example. Meanwhile, in the case in which the user inputs text directly using a software keyboard, for example, the mobile device 10 may extract text having a high probability of input error when the input of a phrase ends.

Note that the designated input prediction engine may determine the relevance of target text on the basis of text positioned before the target text, for example, and then compute a relevancy score. At this point, the text may be words, compounds, morphemes analyzed by morphological analysis, or the like. In addition, the input prediction engine may be stored in the mobile device 10, or stored in another device able to communicate with the mobile device 10.

Figure 17:
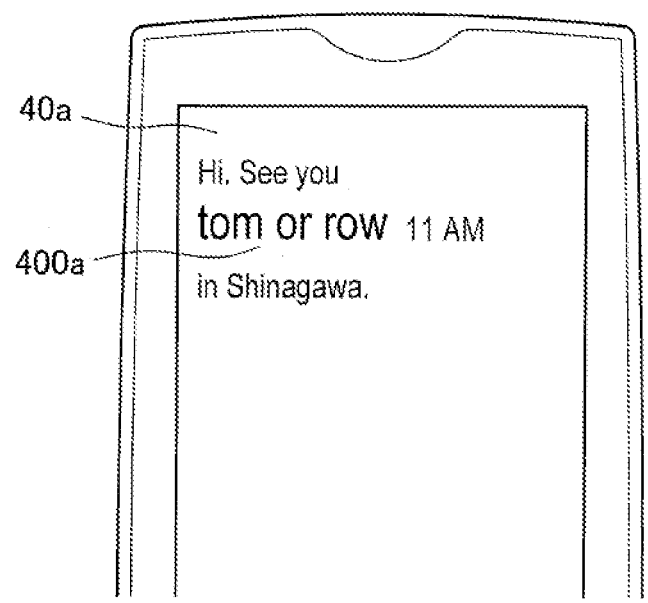
FIG. 17 is an explanatory diagram illustrating an exemplary display of a display screen according to an exemplary modification of the present disclosure.

FIGS. 17 to 20 are explanatory diagrams respectively illustrating exemplary displays of a display screen 40 according to this exemplary modification. As illustrated in FIG. 17, the mobile device 10 may also cause text 400a with a low score computed by the input prediction engine, or in other words text having a high probability of input error, to be displayed on the display screen 40 in a larger font size. According to this exemplary display, since text with a low score is displayed larger than other text, the user is able to easily notice text with a low score, and easily select such text by tapping.

Figure 18:
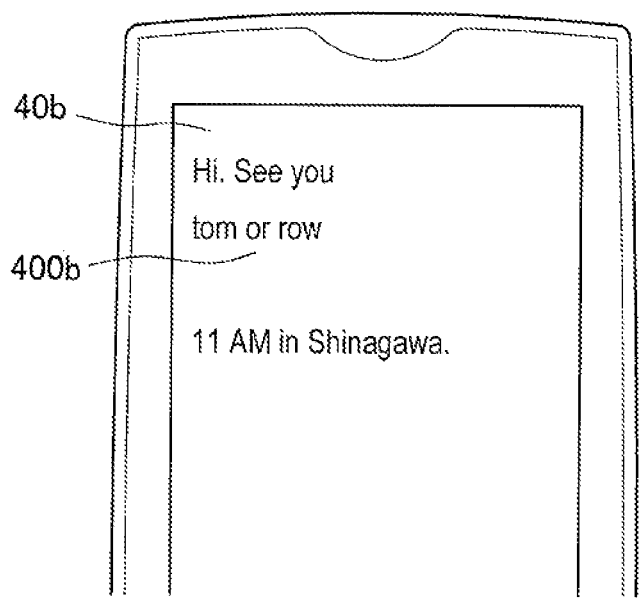
FIG. 18 is an explanatory diagram illustrating an exemplary display of a display screen according to the same exemplary modification.
Figure 19:
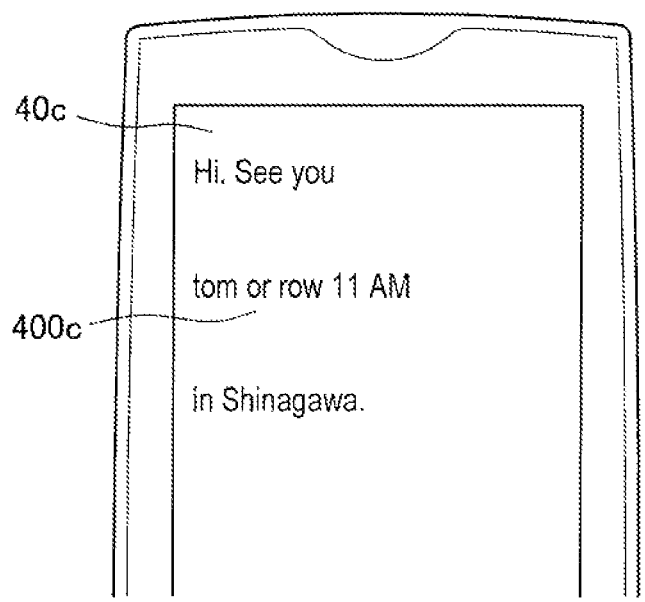
FIG. 19 is an explanatory diagram illustrating an exemplary display of a display screen according to the same exemplary modification.

Also, as illustrated in FIG. 18, the mobile device 10 may also display an input text string on the display screen 40 with a line break inserted at the end of text 400b with a low score. Also, as illustrated in FIG. 19, the mobile device 10 may also display an input text string on the display screen 40 with line breaks inserted before and after a text row that includes text 400c with a low score. According to these exemplary displays, since whitespace is displayed around text with a low score, there is an advantage in that the user is able to easily notice text with a low score, and in addition, it is easy to prevent the user from accidently selecting other text with a touch operation.

Figure 20:
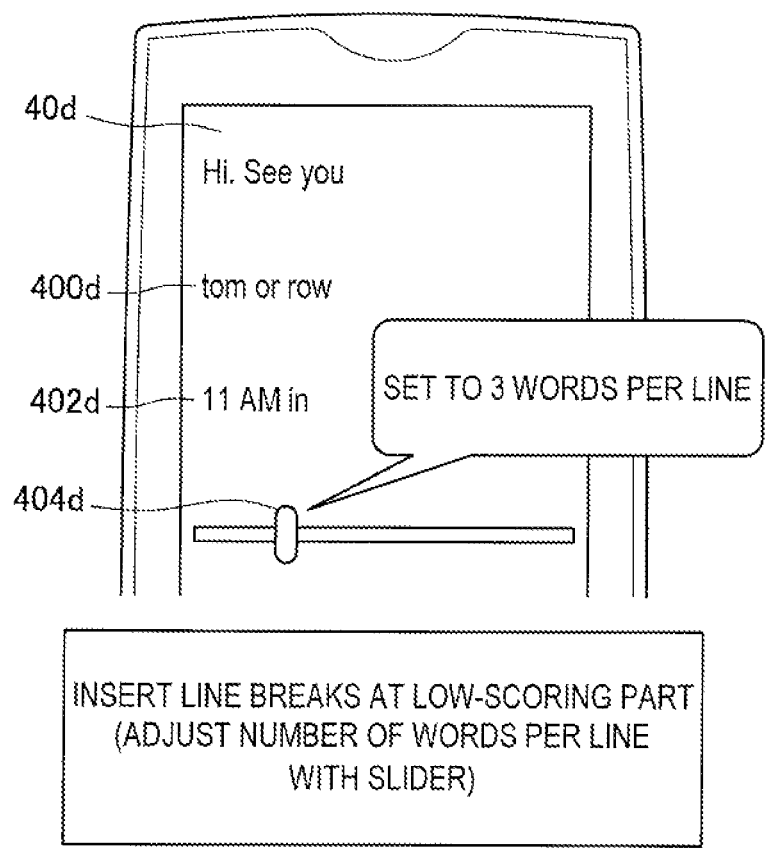
FIG. 20 is an explanatory diagram illustrating an exemplary display of a display screen according to the same exemplary modification.

Also, as illustrated in FIG. 20, the mobile device 10 may also the display screen 40 to display a slider 404d enabling the user to adjust the number of displayed words per line with a touch operation. Subsequently, the mobile device 10 may display an input text string on the display screen 40 with a line break inserted before and after text 400d with a low score. According to these exemplary displays, whitespace is displayed around text with a low score on the display screen 40, and in addition, the user is able to adjust the number of displayed words per line of an input text string. For this reason, the user becomes able to select text with a low score even more easily.

3-2. Exemplary Modification 2

The foregoing describes an example in which a mobile device 10 is equipped with the respective structural elements included in the control unit 100 according to the first embodiment and the second embodiment, such as the text extraction unit 102 and the selection area placement unit 104, for example. However, the present disclosure is not limited to such an example. Instead of being provided in the mobile device 10, the respective structural elements included in the above control unit 100 may also be provided in a communication device able to communicate with the mobile device 10, such as a server, for example. Also, a computer program for exhibiting the same functionality as the respective structural elements included in the above control unit 100 may also be stored in the above communication device rather than being stored in the mobile device 10.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:

a text extraction unit that extracts selection candidate text from a text string displayed on a display screen; and a selection area placement unit that places selectable areas for the selection candidate text on the display screen in a manner that the selectable areas differ from a display area of the selection candidate text.

(2) The information processing apparatus according to (1), wherein
the selection area placement unit places the selectable areas for the selection candidate text on the display screen in a manner that the selectable areas are more enlarged than the display area of the selection candidate text.

(3) The information processing apparatus according to (1) or (2), further including:
a display control unit that superimposes a selection area display image indicating the selectable areas for the selection candidate text on the display screen.

(4) The information processing apparatus according to (3), wherein
the selection area display image is an image that includes the selection candidate text, and is positioned in a same area as the selectable areas for the selection candidate text.

(5) The information processing apparatus according to any one of (1) to (4), further including:
an operation recognition unit that recognizes a touch operation by a user on the display screen,
wherein the text extraction unit extracts the selection candidate text on a basis of a position at which the touch operation is performed.

(6) The information processing apparatus according to (5), wherein
the text extraction unit extracts first text closest to the position at which the touch operation is performed, and one or more second text neighboring the first text, as the selection candidate text.

(7) The information processing apparatus according to (6), wherein
the selection area placement unit places the selectable areas for the individual selection candidate text in an arrangement according to an arrangement of the selection candidate text displayed on the display screen.

(8) The information processing apparatus according to any one of (5) to (7), wherein
the operation recognition unit further recognizes that the user has selected the selection candidate text corresponding to a selectable area existing at the position at which the touch operation is performed on the display screen.

(9) The information processing apparatus according to any one of (5) to (8), wherein
the selection area placement unit places the selectable areas for the selection candidate text in an arc on a basis of the position at which the touch operation is performed on the display screen.

(10) The information processing apparatus according to any one of (5) to (9), wherein
the selection area placement unit places the selectable areas for the selection candidate text along any one edge of the display screen.

(11) The information processing apparatus according to (10), wherein
the text extraction unit extracts one or more text rows as the selection candidate text, on a basis of the position at which the touch operation is performed on the display screen,
the selection area placement unit places text row selection areas that each correspond to the extracted text rows on the display screen as the selectable areas, and
the operation recognition unit further recognizes that the user has selected a text row selection area at the position at which the touch operation is performed on the display screen.

(12) The information processing apparatus according to (11), wherein
the text extraction unit extracts a first text row, and one or more second text rows near the first text row, the first text row being a text row closest to the position at which the touch operation is performed.

(13) The information processing apparatus according to (12), wherein
the selection area placement unit places a text row selection area for the first text row in a manner that the text row selection area is larger than text row selection areas for the second text rows.

(14) The information processing apparatus according to any one of (1) to (13), wherein
the text is a word.

(15) The information processing apparatus according to any one of (10) to (13), wherein
the text is a text row including a word.

(16) An information processing method including:
extracting selection candidate text from a text string displayed on a display screen; and
placing selectable areas for the selection candidate text on the display screen in a manner that the selectable areas differ from a display area of the selection candidate text.

(17) A program causing a computer to function as:
a text extraction unit that extracts selection candidate text from a text string displayed on a display screen; and
a selection area placement unit that places selectable areas for the selection candidate text on the display screen in a manner that the selectable areas differ from a display area of the selection candidate text.

What is claimed is:
1. An information processing apparatus comprising:
a text extraction unit that extracts selection candidate text from a text string displayed on a display screen;
a selection area placement unit that places selectable areas for the selection candidate text on the display screen in a manner that the selectable areas differ from a display area of the selection candidate text, said selectable areas having a first selectable area and a number of second selectable areas; and
an operation recognition unit that recognizes a touch operation by a user on the display screen,
the text extraction unit extracts (i) first text closest to a position at which the touch operation is performed and (ii) one or more second text neighboring the first text, as the selection candidate text, and
the selection area placement unit places the first text in the first selectable area and places each said second text in a respective second selectable area which is above, below, to a right of or to a left of the first selectable area,
in which the first selectable area is different from each said second selectable area such that the first text in the first selectable area is caused to be displayed differently from that of each said second text in each said second selectable area and in which each said second text in each said second selectable area is caused to be displayed differently from that of the text in the text string which is displayed on the display screen and is other than the first text and each said second text.

2. The information processing apparatus according to claim 1, wherein
the selection area placement unit places the selectable areas for the selection candidate text on the display screen in a manner that the selectable areas are more enlarged than the display area of the selection candidate text.

3. The information processing apparatus according to claim 1, further comprising:
a display control unit that superimposes a selection area display image indicating the selectable areas for the selection candidate text on the display screen.

4. The information processing apparatus according to claim 3, wherein
the selection area display image is an image that includes the selection candidate text, and is positioned in a same area as the selectable areas for the selection candidate text.

5. The information processing apparatus according to claim 1, wherein
the selection area placement unit places the center selectable area and each said non-center selectable area in an arrangement according to an arrangement of the selection candidate text displayed on the display screen.

6. The information processing apparatus according to claim 1, wherein
the operation recognition unit further recognizes that the user has selected the selection candidate text corresponding to a selectable area existing at the position at which the touch operation is performed on the display screen.

7. The information processing apparatus according to claim 1, wherein
the selection area placement unit places the selectable areas for the selection candidate text in an arc on a basis of the position at which the touch operation is performed on the display screen.

8. The information processing apparatus according to claim 1, wherein
the selection area placement unit places the selectable areas for the selection candidate text along any one edge of the display screen.

9. The information processing apparatus according to claim 8, wherein
the text extraction unit extracts one or more text rows as the selection candidate text, on a basis of the position at which the touch operation is performed on the display screen,
the selection area placement unit places text row selection areas that each correspond to the extracted text rows on the display screen as the selectable areas, and
the operation recognition unit further recognizes that the user has selected a text row selection area at the position at which the touch operation is performed on the display screen.

10. The information processing apparatus according to claim 9, wherein
the text extraction unit extracts a first text row, and one or more second text rows near the first text row, the first text row being a text row closest to the position at which the touch operation is performed.

11. The information processing apparatus according to claim 10, wherein
the selection area placement unit places a text row selection area for the first text row in a manner that the text row selection area is larger than text row selection areas for the second text rows.

12. The information processing apparatus according to claim 1, wherein the text is a word.

13. The information processing apparatus according to claim 8, wherein the text is a text row including a word.

14. An information processing method comprising:
extracting selection candidate text from a text string displayed on a display screen;
placing selectable areas for the selection candidate text on the display screen in a manner that the selectable areas differ from a display area of the selection candidate text, said selectable areas having a first selectable area and a number of second selectable areas: and
recognizing a touch operation by a user on the display screen,
the extracting extracts (i) first text closest to a position at which the touch operation is performed and (ii) one or more second text neighboring the first text, as the selection candidate text, and
the placing places the first text in the first selectable area and places each said second text in a respective second selectable area which is above, below, to a right of or to a left of the first selectable area,
in which the first selectable area is different from each said second selectable area such that the first text in the first selectable area is caused to be displayed differently from that of each said second text in each said second selectable area and in which each said second text in each said second selectable area is caused to be displayed differently from that of the text in the text string which is displayed on the display screen and is other than the first text and each said second text.

15. A non-transitory computer readable memory having stored thereon a program which upon execution causes a computer to function as:
a text extraction unit that extracts selection candidate text from a text string displayed on a display screen;
a selection area placement unit that places selectable areas for the selection candidate text on the display screen in a manner that the selectable areas differ from a display area of the selection candidate text, said selectable areas having a first selectable area and a number of second selectable areas; and
an operation recognition unit that recognizes a touch operation by a user on the display screen,
the text extraction unit extracts (i) first text closest to a position at which the touch operation is performed and (ii) one or more second text neighboring the first text, as the selection candidate text, and
the selection area placement unit places the first text in the first selectable area and places each said second text in a respective second selectable area which is above, below, to a right of or to a left of the first selectable area,
in which the first selectable area is different from each said second selectable area such that the first text in the first selectable area is caused to be displayed differently from that of each said second text in each said second selectable area and in which each said second text in each said second selectable area is caused to be displayed differently from that of the text in the text string which is displayed on the display screen and is other than the first text and each said second text.

* * * * *